Figure 1:
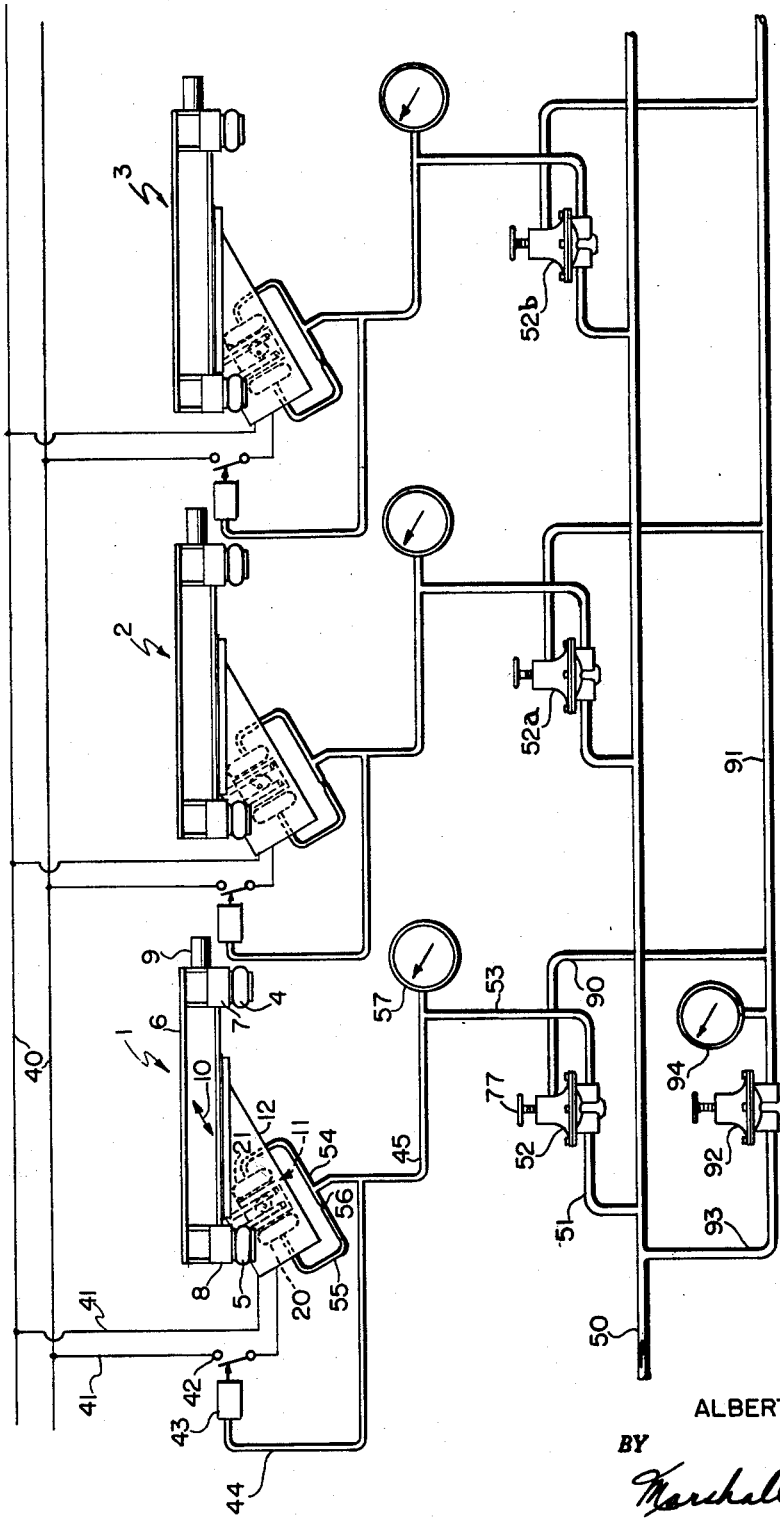

Dec. 3, 1963 — A. MUSSCHOOT — 3,112,823
AIR SPRING PRESSURE CONTROLS
Filed June 27, 1961 — 2 Sheets-Sheet 1

INVENTOR.
ALBERT MUSSCHOOT
BY
Marshall & Wilson
ATTORNEYS

Dec. 3, 1963 A. MUSSCHOOT 3,112,823
AIR SPRING PRESSURE CONTROLS
Filed June 27, 1961 2 Sheets-Sheet 2
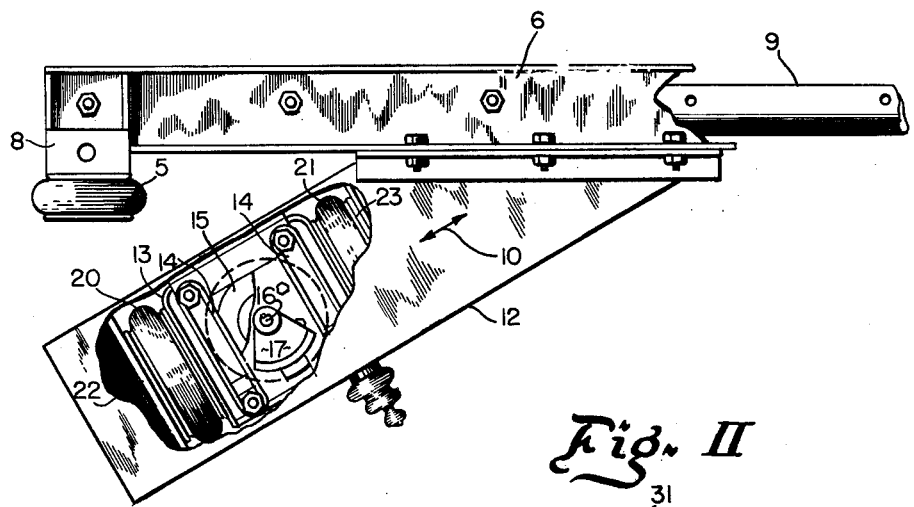
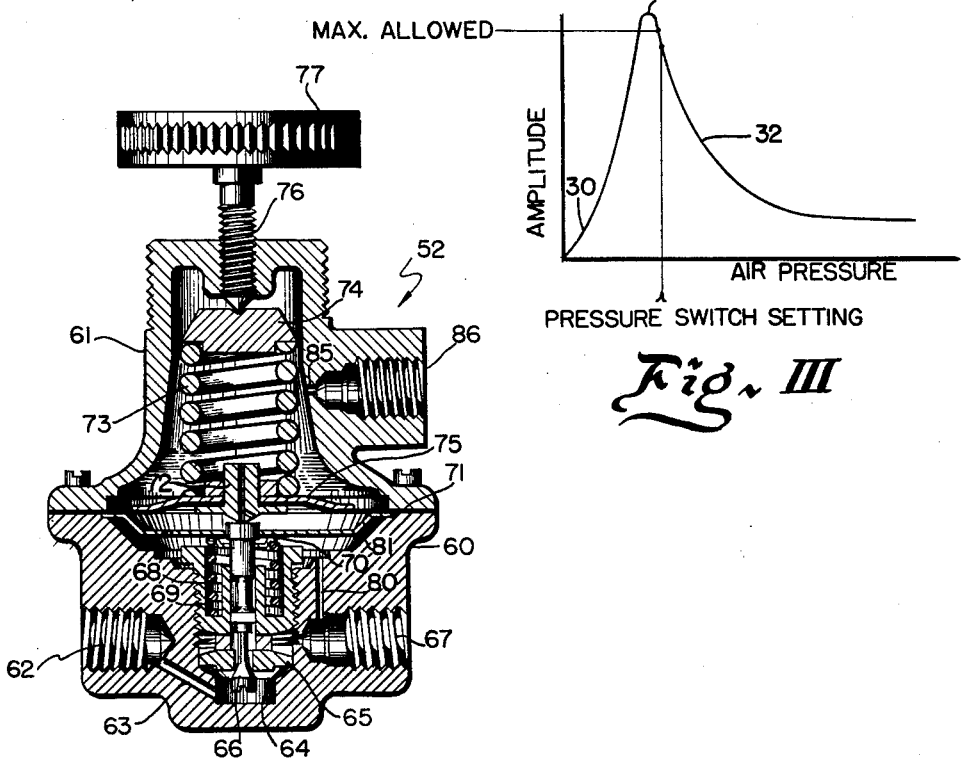
Fig. III
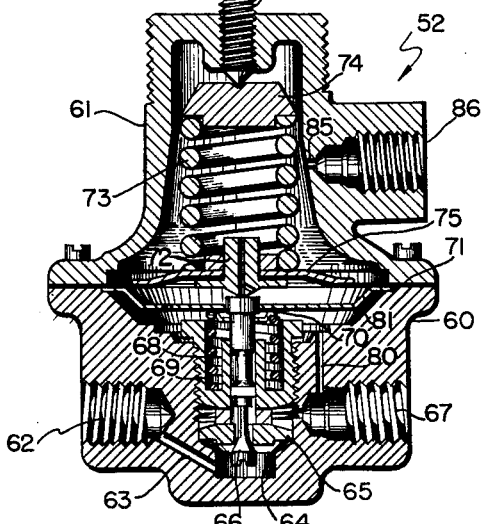
INVENTOR.
ALBERT MUSSCHOOT
BY
Marshall & Wilson
ATTORNEYS

United States Patent Office 3,112,823
Patented Dec. 3, 1963

3,112,823
AIR SPRING PRESSURE CONTROLS
Albert Musschoot, Barrington, Ill., assignor to Chain Belt Company, Milwaukee, Wis., a corporation of Wisconsin
Filed June 27, 1961, Ser. No. 120,019
5 Claims. (Cl. 198—220)

This invention relates to vibratory equipment and in particular to air pressure control systems for controlling one or more vibratory systems from a common control point.

To secure high efficiency in large scale vibratory equipment such equipment is ordinarily tuned to be in resonance at or near the operating speed. When the equipment is driven by an eccentric weight, which applies a constant vibratory force in contrast to the constant stroke, variable force applied by a crank and connecting rod, the amplitude of vibration of the equipment may be readily controlled if the spring rate of the resilient members can be adjusted to vary the tuning of the vibratory system. Air springs, inflated rubber bags similar to those used on trucks and buses, may be used either alone or in combination with other resilient members such as coil springs to form the resilient portion of a tuned vibratory system. When air springs are used in this manner their inflation pressures may be varied to vary the spring rate of the springs and thus the tuning of the system. When such a system is operated near its resonant condition the tuning becomes quite critical and the air pressures in the air springs must be accurately controlled.

It is also desirable in many installations to be able to simultaneously control several such vibratory systems from a single control.

From a safety standpoint it is also desirable in these tuned vibratory systems to arrange the air pressure controls so that an operator cannot inadvertently adjust the air pressure to that pressure at which the system is exactly resonant which would lead to excessive amplitude of vibration and probable damage to the equipment.

The principal object of this invention is to provide a tandem air pressure control for the air springs of a vibratory system in which one regulator establishes a minimum inflation pressure for the spring and another has a full range of control which covers only the operating range of pressures for the air spring.

Another object of the invention is to provide a control for a plurality of vibratory apparatuses in which the amplitudes of vibration of each of the separate assemblies is controlled from a single control.

A still further object of the invention is to provide an air spring control in which a first pressure regulator individual to a set of air springs establishes a minimum operating pressure for that set of springs and a second pressure regulator common to a plurality of sets of springs is operable over a relatively narrow range of pressure and acts on the first regulator to increase the regulated pressure.

More specific objects and advantages are apparent from the following description of a preferred form of the invention.

According to the invention the air springs of a tuned vibratory assembly are inflated from an air line that is equipped with a first pressure regulator having an adjustable spring for setting the minimum pressure limit of the range of operating pressures and having a pressure chamber incorporated in the regulator that is effective to aid the spring in increasing the output pressure control point of the regulator. A second air pressure regulator is arranged to control the pressure in the pressure chamber of the first regulator. When several air spring assemblies in separate vibratory units are to be simultaneously controlled first regulators are provided for each of the assemblies and a single second regulator is employed to control the pressure in the chambers of each of the first regulators, whereby the second regulator controls all of the vibratory assemblies while the individual first regulators provide modification of the control which is individual to that particular regulator.

A preferred form of the invention is illustrated in the accompanying drawings.

In the drawings:

FIG. I is a schematic illustration showing a plurality of vibrator assemblies arranged to be individually adjustable through first regulators and adjustable as a group through a second regulator.

FIG. II is a side elevation, with parts broken away, showing a vibratory feeder incorporating air springs that are controllable according to the invention.

FIG. III is a diagram showing the relationship between the amplitude of vibration of a vibratory assembly driven by a constant exciting force and the inflation pressure of the air springs.

FIG. IV is a vertical section of an air pressure regulator suitable for use in the control system for the air springs.

These specific figures and the accompanying description are intended merely to illustrate the invention and not to impose limitations on its scope.

In the system as shown in FIG. I a plurality of vibratory feeders 1, 2 and 3 are illustrated with their individual controls. Since the feeders are similar only one is specifically described as to common features and where description of the second and third feeder is necessary corresponding reference numerals with the letters *a* and *b* affixed are used.

The feeder 1, representative of the group, is supported on air spring isolators 4 and 5 that allow it to vibrate without transmitting vibratory force to a supporting structure. The feeder 1 includes a frame 6, having cross members 7 and 8 that rest on the air springs 4 and 5, that serves as a support for a shallow trough 9 serving as a material conveying surface. The conveyor assembly 1 is driven along an inclined vibratory path indicated by the double headed arrow 10 by an exciter assembly 11 that is housed in an inclined downwardly directed housing 12 rigidly affixed to the frame 6 of the vibratory feeder 1.

The exciter 11, as seen in FIG. II, comprises an exciter box 13 of substantial mass that is carried on a plurality of parallel links 14 that guide it for movement in a direction generally parallel to the arrow 10. The exciter box 13 includes a motor 15 having an armature shaft 16 carrying eccentric weights 17.

The exciter box 13 is resiliently held by a pair of air springs 20, 21 against movement parallel to the direction of the arrow 10, the path of the vibration of the conveyor or feeder. The air springs 20 and 21 are mounted between abutments 22 and 23 of the housing 12.

In this arrangement, by control of the inflation pressure of the air springs 20 and 21, the exciter mass or exciter box 13 is tuned with respect to the mass of the feeder 1 to be resonant at or near the operating speed of the motor 15. When the system is thus tuned near resonance the exciter box 13 executes vigorous vibratory motion along the direction of the arrow 10 and the vibratory force transmitted through the air springs 20 and 21 provides the necessary vibratory movement of the trough 9 to convey material therealong. The amplitude of vibration of the feeder in response to the rotation of the eccentric weight 17 varies according to the tuning of the system which is controlled by the inflation pressure of the air springs 20 and 21. When the system is operating near resonance the amplitudes are quite large. As the air springs are inflated to higher pressures, to detune the system, the amplitudes of vibration fall off to relatively smaller values.

The relationship between the amplitude of vibration and the inflation pressure in the air springs 20 and 21 is illustrated in the graph of FIG. III. As shown in this figure, with very little air pressure in the air springs the amplitude of vibration of the conveyor or feeder deck or trough 9 is very low as indicated by a branch 30 of the curve. As the pressure in the air springs is increased a resonent condition is approached and the amplitude of vibration rises to a peak 31 that usually is considerably in excess of the safe operating amplitude of vibration of the system. Operation at this point never intentionally occurs because means are provided to stop the motor or prevent starting the motor and the eccentric weights unless the air pressure in the air springs exceeds the pressure corresponding to the peak 31. As the inflation pressure of the air bags 20 and 21 is increased still further the amplitude of vibration falls off quite rapidly as the natural frequency of the system is raised above the operating speed. This is indicated by the branch 32 of the curve. The amplitude of vibration does not decrease to zero even with high pressures but levels off at an amplitude approximately equal to the amplitude that would occur if the air springs were replaced with solid connections.

Referring again to FIG. I, the motor 15 of the various feeders 1, 2 and 3 are supplied from an electric power line 40, shown as a single phase line. A three phase line may be used to supply three phase motors. Branch leads 41 from the power line 40 lead to the motors 15 by way of pressure switches having contacts 42 inserted in series with the lines. If three phase motors are employed, magnetic starters are used and the pressure switch contacts 42 are connected in the coil circuits of the electromagnetic starters. The contacts 42 form part of a pressure sensitive switch 43 that is connected through a branch air pipe 44 to an air pipe or tube 45 that supplies air pressure for inflating the air springs 20 and 21.

Air for inflating the air springs 20 and 21 is obtained from a generally constant pressure air supply, such as a shop air pressure line 50, through a branch pipe 51, pressure regulator 52 and pipe 53 connecting to the pipe 45. From the pipe 45 air is delivered through branch tubes 54 and 55, one or both of which includes a restriction 56, leading to the air springs 20 and 21. The restriction or restrictions 56 included in the branch tubes, which may be provided by using small diameter tubing, are for the purpose of minimizing the circulation or flow of air from one of the air springs 20 to the other spring 21 and back as the exciter box 13 vibrates relative to the housing 12. The circulation of air from one of the air springs to the other acts as a damping effect thus reducing the efficiency of the system. A pressure gauge 57 is connected to the output side of the regulator 52 by tapping into the pipes 45 or 53 and indicates the pressure to which the air springs are inflated.

The pressure regulator 52, as shown in detail in FIG. IV has, in addition to the conventional adjustable control spring, a built-in pressure chamber acting on the pressure control diaphragm along with the control spring so that pressure applied in the pressure chamber acts in addition to the spring to raise the control point and thus the regulated output pressure of the regulator. This regulator assembly 52, as shown in FIG. IV, comprises a lower housing member 60 and an upper housing member 61. The air supply pipe such as the pipe 51 of FIG. I is tapped into an inlet port 62 that communicates through a drilled passage 63 with the bottom end of a blind hole 64 drilled axially in the lower housing 60. A valve assembly comprising a stationary valve body 65 and a movable valve stem 66 controls the flow from the bottom end of the hole 64 to an outlet port 67 which, as shown in FIG. I, connects to the pipe 53. The valve stem 66 is guided in an axial bore in the valve body 65 and is continually urged toward valve closing position by a weak compression spring 68 that is seated in an annular recess 69 in the valve body and at its upper end bears against a washer 70 sleeved over and engaging a shoulder at the upper end of the valve stem 66.

The two housing members, that is, the lower portion 60 and the upper portion 61 of the regulator body are separated by a flexible diaphragm 71 that is clamped between the marginal portions of the housing portions 60 and 61. The diaphragm 71 includes a tubular valve actuator 72 which bears against the upper end of the valve stem 66 to push the valve open and which, when it is relieved from that engagement, provides communication through the diaphragm 71. The diaphragm 71 is urged downwardly toward valve opening position by a stiff regulator spring 73 that is compressed between a spring seat 74 and a washer 75 surrounding the valve actuator 72. The washer 75 serves to distribute the stress over the diaphragm 71. The regulator spring 73 is compressed or urged downwardly toward the diaphragm 71 by the upper seat 74 that is adjustably positioned by a screw 76 and hand wheel 77 threaded axially through the upper portion 61 of the regulator body.

In operation of the regulator the spring 73 pressing against the valve actuator 72 pushes the valve 66 down so that air flows from the port 62 through to the outlet port 67. Pressure at the output port 67 is communicated through a small duct 80 to a chamber 81 formed below the diaphragm 71 and acts on the diaphragm to counteract the force of the spring 73. If the pressure below the diaphragm 71, the output pressure, exceeds the spring force the diaphragm 71 is moved upwardly and the valve 66 closes the passage from the inlet port 62 to the outlet 67. Thus the flow of air through the regulator to the outlet port 67 is controlled by the pressure at the outlet port and the force exerted by the spring 73. If for any reason the pressure at the outlet port 67 should rise above that determined by the spring 73 the diaphragm 71 is pushed upwardly so that the valve actuator 72 leaves the upper end of the valve stem 66 thus opening the passage through the valve actuator to bleed air from the outlet side of the regulator into the chamber in the upper portion 61 of the register. This chamber in the upper portion of the regulator is vented to the atmosphere through a port 85 that leads from the chamber into a drilled and tapped boss 86 on the side of the housing 61. In ordinary use the port 85 leads directly to the atmosphere while for certain purposes as used in the control system of the invention a pressure above atmospheric pressure is maintained in a pipe connected to the port 85 to raise the regulated pressure over that determined by the spring 73.

Referring again to FIG. I, the regulators 52, 52a and 52b are similar to that shown in FIG. IV and have their ports 86 connected through pipes 90 to a control signal pressure line 91. The pressure in the line 91 is controlled by a regulator 92 that is similar to the regulators 52 except that atmospheric pressure is maintained in the chamber surrounding the control spring 73. The regulator 92 is supplied with air from the supply line 50 through pipe 93 and a pressure gauge 94 is provided to indicate the pressure maintained in the control signal pressure line 91.

The improved control system as shown in FIG. I may be used with a single feeder or conveyor or with a plurality of such feeders or conveyors. Assuming first that the control system is used to control a single feeder, the system is adjusted with the regulator 92 set for zero or minimum output pressure and, by adjusting the control knob 77 of the regulator 52, the output pressure of this regulator 52 is adjusted until the inflation pressure of the air springs 20 and 21 provides the maximum allowable amplitude of vibration of the feeder 1. Under this condition the pressure in the air springs is greater than that required to tune to exact resonance and is the minimum working pressure for the air spring. This adjustment of the regulator 52 is then left undisturbed and, if safety requirements demand, the control knob 77 may be removed to make it impossible to inadvertently change the adjustment of the regulator. The amuplitude control for the feeder 1 is provided by the regulator 92 which is adjusted to provide an output pressure in the control signal line 91 which when applied to the chamber in the regulator 52 increases the output pressure of the regulator 52. This increases the spring rates of the air springs 20 and 21, by increasing their inflation pressure, and detunes the vibratory system until the amplitude of vibration is decreased to the desired level. Preferably the range of pressure adjustment provided by the regulator 92 is just sufficient to cover the desired working range of amplitudes.

When several feeders are used in an integrated system and simultaneously controlled from a single control point they are arranged as shown in FIG. I. In this arrangement the regulator 92 serves to simultaneously vary the amplitude of vibration of all of the feeders that are connected in the system while the regulators 52, 52a and 52b may be individually adjusted to vary the relative amplitudes of vibration of the various feeders. Thus if the second feeder 2 is to be operated at a fraction of the operating amplitude of the feeder 1 its regulator 52a is adjusted to provide a higher minimum air pressure in its air springs.

This control system thus provides a single control for a single feeder that may be arranged to have a range of adjustment that is substantially equal to the range of amplitudes of vibration required for full control. At the same time it provides through the primary regulator 52 a minimum operating pressure so that there is no danger of inadvertently setting the pressure controls for an excessive amplitude of vibration. This feature plus the possibility of combining several feeders into an integrated system provides a simple yet reliable and accurate control for a plurality of conveyors and feeders.

Various modifications may be made in the details of construction of the various elements without departing from the spirit and scope of the invention.

Having described the invention, I claim:

1. In a vibratory work performing system, in combination, at least one tuned vibratory assembly including an air spring for tuning control, said assembly having a resonant frequency that varies with the inflation pressure of the air spring, means for applying vibratory force to the assembly at a substantially constant frequency, an air line connected to said air spring, a first pressure regulator in said air line for maintaining a minimum pressure in said air spring at which said resonant frequency is greater than said constant frequency, said first regulator having a diaphragm against which a control pressure acts to increase the output pressure of the regulator, and a second regulator adapted to control said control pressure whereby the pressure in said air spring may be increased above said minimum pressure to raise said resonant frequency.

2. In a vibratory work performing system, in combination, at least one tuned vibratory assembly that includes an air spring for tuning control, said assembly having a natural frequency that varies with the inflation pressure of the air spring, means including an eccentric weight rotated at a substantially constant speed for applying vibratory force to said tuned assembly, a line carrying gas under pressure connected to said air spring, a first pressure regulator in said line, said regulator including a spring and a diaphragm that jointly control its output pressure, means for loading said spring to provide a minimum inflation pressure in the air spring at which the resonant frequency of the assembly is near but greater than said speed of rotation of the eccentric weight, and means including a second regulator for applying controlled gas pressure to said diaphragm to raise the inflation pressure and resonant frequency of said vibratory assembly.

3. In a vibratory work performing system, in combination, at least one tuned vibratory assembly that includes an air spring as a tuning control, said assembly having a resonant frequency that varies with the inflation pressure of the air spring, means including an eccentric weight rotated at a substantially constant frequency for applying a substantially constant vibratory force to the vibratory assembly, a line carrying gas under pressure connected to the air spring, a first pressure regulator for controlling the pressure in said line and air spring, said first regulator including a control diaphragm having a first side exposed to the pressure being regulated and a second side exposed to a signal pressure, a spring acting against the second side of the diaphragm, said spring being adjusted to provide a pressure in said line and air spring such that the resonant frequency of the assembly is near but greater than said constant frequency, and a second regulator for controlling said signal pressure applied to said diaphragm to increase the inflation pressure of said air spring according to the magnitude of said signal pressure.

4. In a vibratory work performing system, in combination, at least one tuned vibratory assembly that includes an air spring as a tuning control, said assembly having a resonant frequency that varies with the inflation pressure of the air spring, a shaft carrying an eccentric weight journaled in the assembly, means for rotating the shaft at a constant speed to generate constant vibratory force, an air line connected to said air spring, a first pressure regulator connected in said air line, said regulator having first means for establishing a minimum inflation pressure in said air spring at which the resonant frequency of the vibratory assembly is near but greater than said constant speed, and externally controlled means in said regulator for increasing the inflation pressure beyond said minimum pressure.

5. In a vibratory work performing system, in combination, a tuned vibratory assembly that includes an air spring as a tuning element, said assembly having a resonant frequency that varies with the inflation pressure of the air spring, means for applying a vibratory force of constant amplitude and constant frequency to the vibratory assembly, first regulator means for maintaining at least a minimum inflation pressure in said air spring at which the resonant frequency of said assembly is near but greater than said constant frequency of the vibratory force, and second regulator means for actuating on the first regulator means for increasing the inflation pressure over said minimum pressure.

References Cited in the file of this patent

UNITED STATES PATENTS

| | | |
|---|---|---|
| 2,984,339 | Musschoot | May 16, 1961 |
| 2,985,281 | Carrier | May 23, 1961 |